United States Patent
Godsk

(10) Patent No.: US 7,914,259 B2
(45) Date of Patent: Mar. 29, 2011

(54) WIND TURBINE BLADES WITH VORTEX GENERATORS

(75) Inventor: Kristian Balschmidt Godsk, Ry (DK)

(73) Assignee: Vestas Wind Systems A/S (DK)

( * ) Notice: Subject to any disclaimer, the term of this patent is extended or adjusted under 35 U.S.C. 154(b) by 15 days.

(21) Appl. No.: 12/563,686

(22) Filed: Sep. 21, 2009

(65) Prior Publication Data
US 2010/0008787 A1 Jan. 14, 2010

Related U.S. Application Data

(63) Continuation of application No. PCT/DK2008/000103, filed on Mar. 13, 2008.

(51) Int. Cl.
*B64C 11/18* (2006.01)
(52) U.S. Cl. ............ 416/146 R; 416/228; 416/236 R
(58) Field of Classification Search ........... 416/146 R, 416/228, 236 R
See application file for complete search history.

(56) References Cited

U.S. PATENT DOCUMENTS

| | | | | |
|---|---|---|---|---|
| 3,578,264 | A * | 5/1971 | Kuethe | 244/200.1 |
| 4,354,648 | A | 10/1982 | Schenk et al. | |
| 6,105,904 | A * | 8/2000 | Lisy et al. | 244/200.1 |
| 6,296,446 | B1 * | 10/2001 | Ishijima et al. | 416/236 A |
| 6,872,048 | B2 * | 3/2005 | Uselton et al. | 415/119 |

FOREIGN PATENT DOCUMENTS

| | | |
|---|---|---|
| EP | 1500814 A1 | 1/2005 |
| EP | 1674723 A2 | 6/2006 |
| WO | 9011929 A1 | 10/1990 |
| WO | 0015961 A1 | 3/2000 |
| WO | 0116482 A1 | 3/2001 |
| WO | 2004061298 A2 | 7/2004 |
| WO | 2004088130 A1 | 10/2004 |
| WO | 2006090215 A1 | 8/2006 |
| WO | 2006122547 A1 | 11/2006 |
| WO | 2007010329 A1 | 1/2007 |

OTHER PUBLICATIONS

J.D. Nickerson Jr., "A study of vortex generators at low Reynolds numbers", AIAA-86-0155,1985.
R.E. Breidenthal, Jr and D.A. Russell, "Aerodynamics of Vortex Generators—Final Report", Jan. 1984-Dec. 1987, NASA-CR-182511, 1988.

(Continued)

*Primary Examiner* — Ninh H Nguyen
(74) *Attorney, Agent, or Firm* — St. Onge Steward Johnston & Reens LLC

(57) ABSTRACT

An advantageous new design of a wind turbine blade and rotor is obtained by providing one, two or more parallel rows of sub-boundary layer vortex generators, whereby a blade is obtained, which is resistant to stall and provides for a high maximum lift coefficient $C_{L,max}$ of the blades and a slender blade design, a low socalled radius specific solidity of the rotor. The very high lift coefficient $C_L$ can reduce the necessary blade area and loads or/and increase the length of the blade and maintain the original loads with higher production. The row or rows of sub-boundary layer vortex generators are in a preferred embodiment of the invention provided in combination with Gurney Flaps generating a very high lift coefficient $C_L$ with a relative gentle stall at very high angle of attack.

15 Claims, 10 Drawing Sheets

OTHER PUBLICATIONS

J. Johansen, N. N. Smensen, M.O.L. Hansen, "CFD vortex generator model". European Wind Energy Conference 2001, Jul. 2-6, 2001, Copenhagen, 20 Denmark.

M. Reck, "CFD with detached eddy simulation and immersed boundary technique applied to oscillating airfoils and vortex generators", Ph.D. thesis, Technical University of Denmark, Dec. 2004.

G.E. Miller, "Comparative performance test on the Mod-2, 2.5-mW wind turbine with and without vortex generators", N95-27978, Presented at the DOEINASA Workshop on Horizontal Axis Wind Turbine Technology, Cleveland Ohio May 8-10, 1984.

G. Godard and M. Stanislas, "Control of decelerating boundary layer. Part 1: Optimization of passive vortex generators", Aerospace Science and Technology 10 (2002) pp.181-191.

J. C. Lin "Control of low-speed turbulent separated flow over a backward facing ramp", Ph.D. thesis from Old Dominion University, May 1992.

J.C. Lin, "Control of turbulent boundary-layer separation using micro-vortex generators", AIAA 99-3404, AIAA Fluid Dynamics Conference, Jun. 28-Jul. 1, 1999 Norfolk, VA.

T.L. Sullivan, "Effect of Vortex Generators on the Power Conversion Performance and Structural Dynamic Loads ofthe Mod-2 Wind Turbine", NASA-TM-83680, Jun. 1984.

Julianne C. Dudek, "Empirical Model for Vane-Type Vortex Generators in a Navier-Stokes Code", AIAA Journal 2006, 0001-1452 vol . 44 No. 8.

K.P. Angele, "Experimental studies of turbulent boundary layer separation and control", Ph.D. Thesis, KTH Mechanics, Stockolm 2003.

Bragg, M. B.; Gregorek, G. M "Experimental study of airfoil performance with vortex generators" Journal of Aircraft 1987 0021-8669 vol.24 No. 5 (305-309).

J. C. Lin, G.V. V Selby and F.G. Howard, "Exploratory Study of Vortex-Generating Devices for Turbulent Flow Separation Control", AIAA-91-0042, 1991.

L. Jenkins, S. Althoff Gorton, and S. Anders, "Flow control device evaluation for an internal flow with an adverse pressure gradient", AIAA 2002-0266, 40th AIAA Aerospace Science Meeting & Exhibit Jan. 14-17, 2002 Reno, NV.

Wendt, B. J, Hingst, W. R. "Flow structure in the wake of a wishbone vortex generator" AIAA Journal 1994, 0001-1452 vol .32 No. 11 (2234-2240).

Chi-Chuan Wang et al., "Flow visualization of annular and delta winlet vortex generators in fin-and-tube heat exchanger application", International Journal of Heat and Mass Transfer 45 (2002) pp. 3803-3815.

Chi-Chuan Wang et al., "Flow visualization of wave-type vortex generators having inline fin-tube arrangement", International Journal of Heat and Mass Transfer 45 (2002) pp. 1933-1944.

C.S. Yao and J.e. Lin, "Flow-field measurement of device-induced embedded streamwise vortex on a flat plate", AIAA 2002-3162, 1st AIAA Flow Control Conference Jun. 24-27, 2002 St. Louis, MO.

P.A. Brandner, GJ. Walker, "Hydrodynamic performance of a vortex generator", Experimental Thermal and Fluid Science 27 (2003) pp. 573-582.

K.P. Angele and F. Grewe, "Investigation of the development of streamwise vortices from vortex generators in APG separation control using PIV", 11th International Symposium on Applications of Laser Techniques to Fluid Mechanics, Jul. 8-11, 2002 Lisbon, Portugal.

J. Johansen et al "Know-Blade Task-3.3 report; Rotor Computations with Aerodynamic Accessories", RiS/iJ-R-1486 (EN), Jan. 2005.

J.G. Betterton et al., "Laser doppler anemometry Investigation on sub boundary layer vortex generators for flow control", 10th International Symposium on Applications of Laser Techniques to Fluid Mechanics, Jul. 10-13, 2000 Lisbon, Portugal.

Storms, Bruce L., Jang, Cory S. "Lift enhancement of an airfoil using a Gurney flap and vortex generators" Journal of Aircraft 1994,0021-8669 vol. 31 No. 3 (542-547).

R. Barrett, S. Farokhi, "On the aerodynamics and performance of active vortex generators", AIAA-93-3447, 1993.

Bruce J. Wendt "Parametric Study of Vortices Shed from Airfoil Vortex Generators", AIAA Journal 2004, 0001-1452 vol.42 No. I1 (2185-2195).

J.C. Lin "Review of research on low-profile vortex generators to control boundary-layer separation", Progress in Aerospace Sciences 38 (2002) pp. 389-420.

J.C. Lin, S.K. Robinson, R.1. McGhee, W.O. Valarezo, "Separation control on high-lift airfoils via micro-vortex generators", Journal of Aircraft 1994 0021-8669 vol. 31 No. 6 (1317-1323).

J.C. Lin, F.G. Howard and G.V. Selby, "Small submerged vortex generators for turbulent flow separation control", Journal of Spacecraft and Rockets, 27 (1990) pp. 503-507.

K.P. Angele and B. Muahmmad-Klingmann, "The effect of streamwise vortices on the turbulence structure of the boundary layer", European Journal of Mechanics BIFluids 24 (2005) pp. 539-554.

R. D. Corrigan and 1.M. Savino, "Vortex generators as a means for increasing rotor performance", in: Intersociety Energy Conversion Engineering, Conference, 20th, Miami Beach, Florida, Aug. 18-23, 1985. Proceedings vol. 3 (A86-24776 10-44) pp. 3.663-3.668.

Adam Jirasek "Vortex-Generator Model and Its Application to Flow Control", Journal of Aircraft 20050021-8669 vol.42 No. 6 (1486-1491).

Danish Search Report; PA 2007 00431; Oct. 31, 2007; 2 pages.

Fuglsang, P. "Design and Verification of the Rise-B1 Airfoil Family for Wind Turbines", Transactions of the ASME Journal of Solar Energy Engineering, Nov. 2004 vol. 126 side 1002-1010; 12 pages.

Fuglsang P et al: "Development of the Riso Wind Turbine Airfoils" Wind Energy, Wiley, Chichester, GB, vol. 7, No. 2, Jan. 1, 2004, pp. 145-162, 1P008068651 ISSN: 1099-1824; 18 pages.

Reuss, R. L. et al.; "Effects of Surface Roughness and Vortex Generators on the NACA 4415 Airfoil"; The Ohio State University, National Renewable Energy Laboratory, NREL/TP-442-6472; Dec. 1995; 102 pages.

Wetzel, K. et al., "Influence of Vortex Generators on NREL 5807 Airfoil Aerodynamic Characteristics and Wind Turbine Performance", Wind Engineering, vol. 19, 1995; 9 pages.

Sandia Laboratories: Sand 2004-0074, Innovative Design Approaches for Large Wind Turbine Blades, Final Report, WindPACT Blade System Design Studies, Maj 2004; 48 pages.

International Search Report; PCT/DK2008/000103; Dec. 5, 2008; 3 pages.

Corten, G. P; "Stall Flag Diagnostics of the Aerpac 43m Rotor"; Energy Research Centre of the Netherlands; ECN-C-01-042; Maj 2001; 15 pages.

Timmer, W. A et al.: "Summary of the Delft University Wind Turbine Dedicated Airfoils", The American Institute of Aeronautics and Astronautics, Inc. AIAA og The American Society of Mechanical Engineers, ASME, AIAA-2003-0352, 2003; 12 pages.

International Preliminary Report on Patentability and Written Opinion of the International Searching Authority; PCT/DK2008/000103; Sep. 3, 2009; 6 pages.

* cited by examiner

WIND TURBINE BLADES WITH VORTEX GENERATORS

CROSS-REFERENCE TO RELATED APPLICATIONS

The present application is a continuation of pending International patent application PCT/DK2008/000103 filed on Mar. 13, 2008 which designates the United States and claims priority from Danish patent application PA 2007 00431 filed on Mar. 20, 2007, the content of which is incorporated herein by reference.

FIELD OF THE INVENTION

The present invention relates to wind turbine blades and a wind turbine rotor wherein the provision of vortex generators on the blades is used to obtain an advantageous new design of a rotor.

BACKGROUND OF THE INVENTION

The use of vortex generators for reduction of tendency to separation of the air flow on aircraft wings has long been well-known in the art, and an example is given in U.S. Pat. No. 4,354,648 disclosing a aircraft wing having two or three rows of low-profile vortex generators extending from the suction side surface e.g. 10-20% of the thickness of the boundary layer.

Application of vortex generators on wind turbine blades is also well known in the art. The use of vortex generators on wind turbine blades to counteract flow separation and stall is disclosed in WO 00/15961 (LM Glasfiber) showing the use of vortex generators along the whole span of the blade or at the tip end thereof, the vortex generators being of a generally triangular shape and extending from the suction side of the blades to a height of 0.01 to 10%, preferably 0.25 to 6% of the chord length.

Also in WO 01/16482 (Stichting) wind turbine blades provided with vortex generators on the suction side and/or on the pressure side are disclosed. The preferred height of the vortex generators is disclosed as about 1% of the chord length and the purpose of the vortex generators is to prevent the occurrence of sudden stall during gusts of wind causing loss of production and vibrations.

In WO 2006/122547 (Vestas) yet another disclosure is made of wind turbine blades with vortex generators, in this case for a pitch controlled wind turbine, with the purpose of reducing the emission of noise during stall. The height of the vortex generators is disclosed to be between 0.01% and 5% of the chord length.

Thus, the provision of vortex generators, including micro vortex generators to wind turbine blades is well known in the art with the purpose of reducing noise emission and preventing stall as well as making the occurrence of stall more gentle and predictable. The fact that vortex generators increases the drag coefficient of the blade and thus reduces the power production of the wind turbine delimits the actual use of vortex generators on wind turbine blades.

SUMMARY OF THE INVENTION

With the present invention it has been realised that an advantageous new design of a wind turbine blade and rotor may be obtained by providing two or more parallel rows of micro or sub-boundary layer vortex generators, whereby a blade is obtained, which is resistant to stall and provides for a high maximum lift coefficient $C_{L,max}$ of the blades and a slender blade design, a low so-called radius specific solidity of the rotor.

The concept of micro vortex generators has previously been tested e.g. on airplane flaps and showed that very small vortex generators with a height of about 0.2% of airfoil chord length could increase the maximum $C_L$ with only a small increase in airfoil drag coefficient $C_D$ determining the aerodynamic resistance of the airfoil. By combining the micro vortex generators in rows at different chord position e.g. 20% and 50% and possibly also at 70%, it has been found that the maximum lift coefficient $C_L$ can be increased to extremely high values and the stall will to a large extend be avoided and when it occurs, it will start more gentle as compared to only one row of larger vortex generators with a much smaller increase in airfoil drag coefficient $C_D$ as compared to only on row of larger vortex generators of a height sufficiently to obtain similar results in the increase of the maximum lift coefficient $C_{L,max}$.

By the term height is herein understood a maximum height of the vortex generator in a direction perpendicularly away from the surface of the blade at the position where the vortex generator in question is arranged.

The low height of the vortex generators, where they do not extend through the whole of the boundary layer, reduces the induced drag from the vortex generators, which makes it feasible also to apply the vortex generators to the outer part of the blade, where the relative wind velocity and thereby the possible induced drag is highest. By the provision of two or three parallel rows of vortex generators, the positive effect of the vortex generators on the aerodynamic characteristics of the blade is obtained, and an advantageous new wind turbine blade design is reached.

The provision of the vortex generators on the blades according to the invention results in an increased maximum lift coefficient $C_{L,max}$ of the blade due to the reduction in tendency to separation of the flow over the blade, i.e. the tendency to stall, caused by the effect of the vortex generators, which allows a blade to operate with a higher angle of attack (AoA) without the occurrence of stall. The vortex generators also makes it possible to employ blades having a high lift profile as the ones disclosed in WO 2007/010329 and obtain a very high maximum lift coefficient $C_{L,max}$ of the blade when operating the blade at high angles of attack. The magnitude of the maximum lift coefficient $C_{L,max}$ of the blade will generally depend on the design of the vortex generators, the number of consecutive rows of vortex generators as well as the design of the blade profile. The operation of wind turbine with blades of high lift and low solidity as disclosed in WO 2006/090215 may also be improved by the application of the present invention.

The present invention in all its aspects as presented herein may be applied to all sizes of wind turbine blades and rotors, but it is particularly advantageous to apply the invention to rotor blades of a length exceeding 30 meters and to wind turbine rotors exceeding a rotor diameter of about 60-63 meters, as the relative wind speed experienced by the outer part of the blades will be high and therefore more exposed to problems involving separation of the flow over the blades, i.e. to stall. Furthermore, the larger wind turbines, i.e. having rotor blades of a length exceeding 30 meters and wind turbine rotors exceeding a rotor diameter of about 60-63 meters are much more vulnerable to aerodynamic loads and the positive effect of applying the present invention is much more pronounced than for smaller wind turbines.

Thus, the present invention relates in a first aspect to a wind turbine blade comprising
- a first row of vortex generators arranged in the longitudinal direction of the blade on a suction side thereof, wherein the height of said vortex generators in a direction away from the surface of the blade is within the range of 0.1% to 0.65%, preferably 0.15% to 0.35% of the chord length of the blade, and
- a second row of vortex generators arranged in the longitudinal direction of the blade on a suction side thereof, wherein the height of said vortex generators in a direction away from the surface of the blade is within the range of 0.1% to 1%, preferably 0.15% to 0.5% of the chord length,
- wherein the first and second row of vortex generators are provided along at least 10% of the longitudinal extend of the blade, and the second row of vortex generators extends at a chord wise distance from the leading edge in the range from 20% to 50% of the chord length further away from the leading edge than the first row of vortex generators.

The second row of vortex generators may extend further away from the blade surface than the first row in that the thickness of the boundary layer generally is higher at the position of the second row and the drag induced by the second row of vortex generators therefore is sufficiently low even if it is higher than the first row of vortex generators.

The rows of vortex generators may be applied at any position on the blade, depending on the design of the blade and its aerodynamic properties. In a preferred embodiment, the rows of vortex generators are provided along the outer half part of the longitudinal extend of the blade, i.e. along at least 20% of the outer half part, preferably at least 30% and most preferred along at least 50% of the outer half part of the blade.

The first row of vortex generators extends preferably at a chord wise distance from the leading edge in the range from 10% to 40%, more preferred in the range from 15% to 35% of the chord length.

The second row of vortex generators extends preferably at a chord wise distance from the leading edge in the range from 30% to 70% and more preferred in the range from 40% to 60% of the chord length.

In a particularly preferred embodiment of the present invention, the wind turbine further comprises
- a third row of vortex generators arranged in the longitudinal direction of the blade on a suction side thereof and provided along said at least 10% of the longitudinal extend of the blade, i.e. coinciding with the longitudinal position of the first and second row of vortex generators, wherein the height of said vortex generators in a direction away from the surface of the blade is within the range of 0.25% to 2%, preferably 0.4% to 1.5% of the chord length, and
- wherein the third row of vortex generators extends at a chord wise distance from the leading edge in the range from 10% to 30% of the chord length further away from the leading edge than the second row of vortex generators.

The third row of vortex generators may extend further out from the blade surface than the first and second rows of vortex generators in that the thickness of the boundary layer generally is higher at the position of the third row closest to the trailing edge of the blade profile and the drag induced by the second row of vortex generators therefore is sufficiently low even if it is higher than the first and second rows of vortex generators.

It is preferred that the third row of vortex generators extends at a chord wise distance from the leading edge in the range from 50% to 90%, more preferred in the range from 60% to 80% of the chord length.

With a second aspect of the present invention it has furthermore been realised that an advantageous new design of a wind turbine blade rotor may be obtained by combining the provision of micro or sub-boundary layer vortex generators on the blades with a high maximum lift coefficient $C_{L,max}$ of the blades and a slender blade design, a low so-called radius specific solidity of the rotor.

The micro vortex generators increases the drag coefficient of the blade as compared to an ordinary wind turbine blade design, but it also allows for a blade design with respect to angle of attack and aerodynamic profiles which has a significantly higher maximum lift coefficient $C_{L,max}$ as the tendency to stall at high angles of attack is reduced and the stall, when it occurs, is less abrupt and more gentle. The higher lift coefficient makes it possible to reduce the chord length of the blade and thus the radius specific solidity of the rotor, and still obtain an acceptable power production from the wind turbine. However, the more slender blade design results in a reduction of the drag coefficient of the blade, which counteracts the increase of drag coefficient caused by the vortex generators. With the present combination of features, the drawbacks of providing the blades with vortex generators are reduced or eliminated, and an advantageous slender blade design is obtained.

A rotor with ultra low solidity operating with ultra high lift coefficients provides a possibility for a load reduction or/and more productive rotor with equal loads. An important issue in design of wind turbine blades is the resistance towards fatigue damage. In general, the fatigue is driven by the chord size, i.e. the larger the chord, the higher the fatigue loads on the blade. Furthermore, the vibrations arising in the blade in case of stall also increase the fatigue damages. It is therefore a considerable advantage of the present invention that despite the blade is operated with a higher design angle of attack AoA the fatigue characteristic of the blade is improved, mainly due to the reduction in chord length.

Extreme wind gusts with wind speeds up to 70 m/s generate extreme loads on the wind turbine. During extreme wind speeds the wind turbine rotor is idling, i.e. rotating slowly or is stopped with the blades in stop position and without power production. The magnitude of the extreme loads in such situations is depending on the chord length of the rotor blades, i.e. the larger the chord, the higher the extreme loads. It is therefore also a considerable advantage of the present invention that extreme loads are reduced by the slender blade design.

The principle of this aspect of the present invention is the use of one or preferably multiply rows of micro (or sub boundary layer) vortex generators attached to at least a part of the whole span of the blade, in a preferred embodiment along an outer half part of the blade, and in a preferred embodiment of the invention in combination with Gurney Flaps generating a very high lift coefficient $C_L$ with a relative gentle stall at very high angle of attack. The very high lift coefficient $C_L$ can reduce the necessary blade area and loads or/and increase the length of the blade and maintain the original loads with higher production.

When this furthermore is combined with the use of Gurney Flaps at the inboard part of the blade (such as the inner 10-50% of the blade radius as measured from the hub centre) to make a wind turbine blade of extreme slenderness.

Thus, the present invention relates also to a wind turbine rotor having at least two blades, each blade comprising a first row of vortex generators arranged in the longitudinal direction of the blade on a suction side (also called the leeward side) thereof and provided along at least 10% of the longitudinal extend of the blade and preferably along substantially all of the outer half part of the blade, wherein the height of said vortex generators in a direction away from the blade surface on which it is provided is within the range of 0.1% to 1% of the chord length, preferably within the range of 0.15% to 0.35% of the chord length as measured at the longitudinal position where the vortex generators are provided.

The combined radius specific solidity ($Sol_r$) of the rotor is below a value of 0.025 at distance r from the hub being 50% of the rotor radius R, below a value of 0.017 at distance r from the hub being 70% of the rotor radius R, and below a value of 0.011 at distance r from the hub being 90% of the rotor radius R.

The solidity of a wind turbine blade is the ratio between the area of the blades projected into the rotor plane and the total area covered by the rotating blades, $A_{blade}$. The combined solidity, i.e. the sum of solidifies of the blades, is hence:

$$Sol = \frac{n \cdot A_{blade}}{\pi R^2}$$

Where n is the number of wind turbine blades, e.g. 2, 3 or 4. The combined radius specific solidity ($Sol_r$) of the rotor is defined as $$Sol_r = \frac{n \cdot c_r}{2\pi R}$$

n being the number of blades in the rotor, $c_r$ the chord length at the distance r from the hub and R the radius of the rotor, i.e. the distances as measured from the centre of the hub, which is understood hereinafter. The combined radius specific solidity ($Sol_r$) of the rotor preferably develops smoothly along the longitudinal direction of the blade, and the combined radius specific solidity of the rotor is expected to be below a linear interpolation between the indicated values.

Also, the maximum lift coefficient $C_{L,max}$ of each of the blades, valid for a two-dimensional flow passing the profile of the blade, fulfil that $C_{L,max} > 1.75$ for $Re = 3.0*10^6$ $C_{L,max} > 1.80$ for $Re = 4.5*10^6$ $C_{L,max} > 1.85$ for $Re = 6.0*10^6$ $C_{L,max} > 1.90$ for $Re = 7.5*10^6$ for at least the part of the longitudinal extend of the blades comprising the vortex generators.

The first row of vortex generators may be applied at any position on the blade, depending on the design of the blade and its aerodynamic properties. In a preferred embodiment, the first row of vortex generators is provided along the outer half part of the longitudinal extend of the blade, i.e. along at least 20% of the outer half part, preferably at least 30% and most preferred along at least 50% of the outer half part of the blade.

It is preferred that the maximum lift coefficient $C_{L,max}$ of each of the blades, valid for a two-dimensional flow passing the profile of the blade, furthermore fulfil the conditions that $C_{L,max} > 1.65$ for $Re = 1.5*10^6$ and $C_{L,max} > 1.95$ for $Re = 9.0*10^6$ $C_{L,max} > 2.00$ for $Re = 10.0*10^6$ for at least the part of the longitudinal extend of the blades comprising the vortex generators.

In order to further improve the protection against the occurrence of flow separation, it is preferred that a second row of vortex generators is arranged in the longitudinal direction of the blade on a suction side thereof and provided along said at least 10% of the longitudinal extend of the blade, i.e. coinciding with the longitudinal position of the first row of vortex generators, wherein the height of said vortex generators in a direction away from the surface of the blade is within the range of 0.1% to 2% of the chord length, and wherein the second row of vortex generators extends at a chord wise distance from the leading edge in the range from 20% to 50% of the chord length further away from the leading edge than the first row of vortex generators, preferably in the range from 30% to 70% and most preferred in the range from 40% to 60% of the chord length. By the provision of a second row of vortex generators at this chord wise position, the boundary layer of the flow past the blade is further reinforced and the risk of a separation of the flow starting near the trailing edge of the blade and moving upwind towards the leading edge of the blade is reduced.

With the rotor having blades comprising the second row of vortex generators, it is preferred that the maximum lift coefficient $C_{L,max}$ of each of the blades, valid for a two-dimensional flow passing the profile of the blade, fulfil that $C_{L,max} > 1.90$ for $Re = 3.0*10^6$ $C_{L,max} > 1.95$ for $Re = 4.5*10^6$ $C_{L,max} > 2.0$ for $Re = 6.0*10^6$ $C_{L,max} > 2.10$ for $Re = 7.5*10^6$ $C_{L,max} > 2.15$ for $Re = 10*10^6$ for at least the part of the longitudinal extend of the blades comprising the vortex generators.

An even more satisfactory result in reducing the tendency to separation of the flow and thereby stall of the blades is obtained by the provision of a third row of vortex generators arranged in the longitudinal direction of the blade on a suction side thereof and provided along at least 10%, i.e. coinciding with the longitudinal position of the first and second row of vortex generators, wherein the height of said vortex generators in a direction away from the surface of the blade is within the range of 0.1% to 2% of the chord length, and wherein the third row of vortex generators extends at a chord wise distance from the leading edge in the range from 10% to 30% of the chord length further away from the leading edge than the second row of vortex generators, preferably in the range from 50% to 90% and most preferred in the range from 60% to 80% of the chord length. By the provision of a third row of vortex generators at this chord wise position, the boundary layer of the flow past the blade is yet further reinforced and the risk of a separation of the flow starting near the trailing edge of the blade and moving upwind towards the leading edge of the blade is reduced which provides for the use of a blade design with very high maximum lift coefficients and very low radius specific solidity of the rotor.

With the rotor having blades comprising a third row of vortex generators, it is preferred that the maximum lift coefficient $C_{L,max}$ of each of the blades, valid for a two-dimensional flow passing the profile of the blade, fulfil that $C_{L,max} > 2.0$ for $Re = 3.0*10^6$ $C_{L,max} > 2.05$ for $Re = 4.5*10^6$ $C_{L,max} > 2.1$ for $Re = 6.0*10^6$ $C_{L,max} > 2.2$ for $Re = 7.5*10^6$ $C_{L,max} > 2.25$ for $Re = 10*10^6$ for said part of the longitudinal extend of the blades comprising the vortex generators.

The vortex generators should be designed to extend through only a part of the boundary layer, sufficient to generate vortices of a size that may transport air of a higher relative velocity closer to the surface of the blade and thereby reinforce the boundary layer against the tendency to flow separation. On the other hand, the vortex generators should not extend further out from the blade surface than necessary in order to avoid the generation of excessive drag. Thus, the height of at least 80% of said vortex generators of the first row is preferably within the range of 0.15% and 0.35% of the chord length, the height of at least 80% of said vortex generators of the second row is preferably within the range of 0.25% and 1% of the chord length and the height of at least 80% of said vortex generators of the third row is preferably within the range of 0.25% and 1% of the chord length, the thickness of the boundary layer being higher at the position of the second and possibly third row of vortex generators.

The combined radius specific solidity ($Sol_r$) of the rotor is in a preferred embodiment below a value of 0.022 at distance r from the hub being 50% of the rotor radius R, below a value of 0.015 at distance r from the hub being 70% of the rotor radius R, and below a value 0.009 at distance r from the hub being 90% of the rotor radius R.

In a more preferred embodiment, the combined radius specific solidity ($Sol_r$) of the rotor is below a value of 0.020 at distance r from the hub being 50% of the rotor radius R, below a value of 0.014 at distance r from the hub being 70% of the rotor radius R, and below a value 0.0085 at distance r from the hub being 90% of the rotor radius R.

In a yet more preferred embodiment, the combined radius specific solidity ($Sol_r$) of the rotor is below a value of 0.017 at distance r from the hub being 50% of the rotor radius R, below a value of 0.012 at distance r from the hub being 70% of the rotor radius R, and below a value 0.0075 at distance r from the hub being 90% of the rotor radius R.

The combined radius specific solidity ($Sol_r$) of the rotor preferably develops smoothly along the longitudinal direction of the blade, and the combined radius specific solidity of the rotor is expected to be below a linear interpolation between the indicated sets of values.

The defined values for the maximum lift coefficient $C_{L,max}$ of the blades are preferably fulfilled for at least the outer 75% of the longitudinal extend of the blades.

With the term vortex generators are herein generally understood means for generating vortices in the boundary layer of the airflow over the suction side of the blades. However, a preferred type of vortex generators are of a design for during operation of the rotor to produce vortices with a centre line of vorticity extending substantially in the transverse direction of the blade, i.e. substantially in the main direction of the relative airflow with respect to the blade. The vortex generators are preferably provided in the form of a delta shaped protrusions, which are slanted with respect to the transverse direction of the blades. Other designs of the vortex generators are also possible and the literature on the subject presents a vast number of suitable vortex generator designs. The distance in the longitudinal direction of the blade between the individual vortex generators forming a row as understood in the present context is generally in the range of 1 to 8 times the height of the vortex generators, preferably in the range of 2 to 6 times the height of the vortex generators, and the length of the individual vortex generator is also generally in the range of 1 to 8 times the height of the vortex generators, preferably in the range of 2 to 6 times the height of the vortex generators. The thickness of the protrusions that in a preferred embodiment of the invention constitute the vortex generators is generally in the range of 0.05 to 1 time the height of the vortex generators, preferably in the range of 0.2 to 0.6 times the height of the vortex generators.

In a preferred embodiment are neighbouring vortex generators slanted in opposing directions with respect to the transverse direction of the blade, so that the generated neighbouring vortices will obtain opposing directions of rotation, such as vortex generators comprise sides alternately slanted at an angle in relation to the transverse direction of the blade of between 50° and 2°, preferably between 30° and 5° and most preferred between 20° and 10°, and −50° and −2°, preferably between −30° and −5° and most preferred between −20° and −10°. Embodiments of such vortex generators are e.g. disclosed in international patent application WO 2006/122547 (Vestas).

The vortex generators may be attached to the wind turbine blades individually or as pairs by means of attachment means such as screws, bolts, rivets, welding or preferably adhesive. Alternatively, the vortex generators are attached to the wind turbine blade as part of a string of tape, a coil or a band by means of attachment means such as screws, bolts, rivets, welding or preferably adhesive. In another alternative embodiment, the vortex generators are formed integrally with the wind turbine blades.

The vortex generators may in a particularly preferred embodiment be provided as plates extending in an angle between 60° and 120°, e.g. orthogonally, from the surface of said wind turbine blades suction surface side.

The combined radius specific solidity ($Sol_r$) of the rotor is in a preferred embodiment below a value of 0.022 at distance r from the hub being 50% of the rotor radius R, below a value of 0.015 at distance r from the hub being 70% of the rotor radius R, and below a value 0.009 at distance r from the hub being 90% of the rotor radius R.

In a more preferred embodiment, the combined radius specific solidity ($Sol_r$) of the rotor is below a value of 0.020 at distance r from the hub being 50% of the rotor radius R, below a value of 0.014 at distance r from the hub being 70% of the rotor radius R, and below a value 0.0085 at distance r from the hub being 90% of the rotor radius R.

In a yet more preferred embodiment, the combined radius specific solidity ($Sol_r$) of the rotor is
   below a value of 0.017 at distance r from the hub being 50% of the rotor radius R,
   below a value of 0.012 at distance r from the hub being 70% of the rotor radius R, and
   below a value 0.0075 at distance r from the hub being 90% of the rotor radius R.

The combined radius specific solidity ($Sol_r$) of the rotor preferably develops smoothly along the longitudinal direction of the blade, and the combined radius specific solidity of the rotor is expected to be below a linear interpolation between the indicated sets of values.

The defined values for the maximum lift coefficient $C_{L,max}$ of the blades, are preferably fulfilled for at least the outer 75% of the longitudinal extend of the blades.

Also the inner part of the rotor is preferably designed with slender blades and the combined radius specific solidity ($Sol_r$) of the rotor is preferably
   below a value of 0.043 at distance r from the hub being 20% of the rotor radius R, and
   below a value 0.036 at distance r from the hub being 30% of the rotor radius R.

In a more preferred embodiment, the combined radius specific solidity ($Sol_r$) of the rotor is
   below a value of 0.038 at distance r from the hub being 20% of the rotor radius R, and
   below a value 0.031 at distance r from the hub being 30% of the rotor radius R.

In a yet more preferred embodiment, the combined radius specific solidity ($Sol_r$) of the rotor is
   below a value of 0.033 at distance r from the hub being 20% of the rotor radius R, and
   below a value 0.025 at distance r from the hub being 30% of the rotor radius R.

The combined radius specific solidity ($Sol_r$) of the rotor preferably develops smoothly along the longitudinal direction of the blade, and the combined radius specific solidity of the rotor is expected to be below a linear interpolation between the indicated values for the outer as well as the inner part of the blade.

In yet a preferred embodiment of the present invention, the blades are provided with Gurney flaps along the longitudinal direction extending at least between a distance r from the hub being 20% of the rotor radius R to 40% of the rotor radius R, preferably from 10% of the rotor radius R to 50% of the rotor radius R.

The height of the Gurney flaps is preferably within the range of 0.35% to 2% of the chord length, more preferred within the range of 0.5% to 1.5% of the chord length.

It is also preferred that said row or rows of vortex generators are provided not only at the outer part of the blades but also along at least 10% of the inner half part of the longitudinal extend of the blade, preferably along at least 25%, and most preferred along at least 50% of the inner half part of the longitudinal extend of the blade.

The inner part of the blade and in particular the root section is highly sensitive to stall since the blade thickness is large and the twist of the blade in many operational situations is far from optimal for this part of the blade, leading to a too high angle of attack of the experienced inflow. The possible stall of the flow over the inner part of the blade influences the neighbouring sections of the blade and may decrease the aerodynamic performance of the blade significantly. Therefore, it is of high importance for the overall operation of the blade and thus of the wind turbine that stall at the inner part of the blade and in particular of the root section is prevented even at high angles of attack and on thick profile sections, for which the provision of vortex generators, in particular of multiple rows of vortex generators has proven to be suitable.

In particular the combination of vortex generators and Gurney Flaps on the inner section of the blade has shown to be favourable to the overall performance of the blade and thereby the rotor.

The provision of vortex generators and in particular combined with the provision of Gurney Flaps on the inner section of the blade makes it possible to provide the near-hub inner section of the blade with an actual aerodynamic profile instead of a cylinder-like profile.

Thus, the provision of vortex generators and possibly the Gurney Flaps makes it possible to operate a wind turbine having blade of a thickness ratio $t/c_r$, i.e. a ratio of the maximum thickness (t) to the chord length ($c_r$) of the blade profiles defined as
   within the range of 0.35 and 0.70 at distance r from the hub being 10% of the rotor radius R,
   within the range of 0.20 and 0.38 at distance r from the hub being 20% of the rotor radius R,
   within the range of 0.18 and 0.33 at distance r from the hub being 30% of the rotor radius R,
   within the range of 0.17 and 0.30 at distance r from the hub being 50% of the rotor radius R,
   within the range of 0.15 and 0.24 at distance r from the hub being 70% of the rotor radius R, and
   within the range of 0.15 and 0.18 at distance r from the hub being 90% of the rotor radius R.

The present invention also relates to a wind turbine having a rotor as defined above, which preferably is of the type, which further comprises means for controlling the pitch angle of the blades of the rotor.

The scope of protection is defined by the appended set of claims.

BRIEF DESCRIPTION OF THE DRAWINGS

The detailed disclosure of the present invention is illustrated by the enclosed figures of which

DETAILED DESCRIPTION OF THE INVENTION

Figure 1:
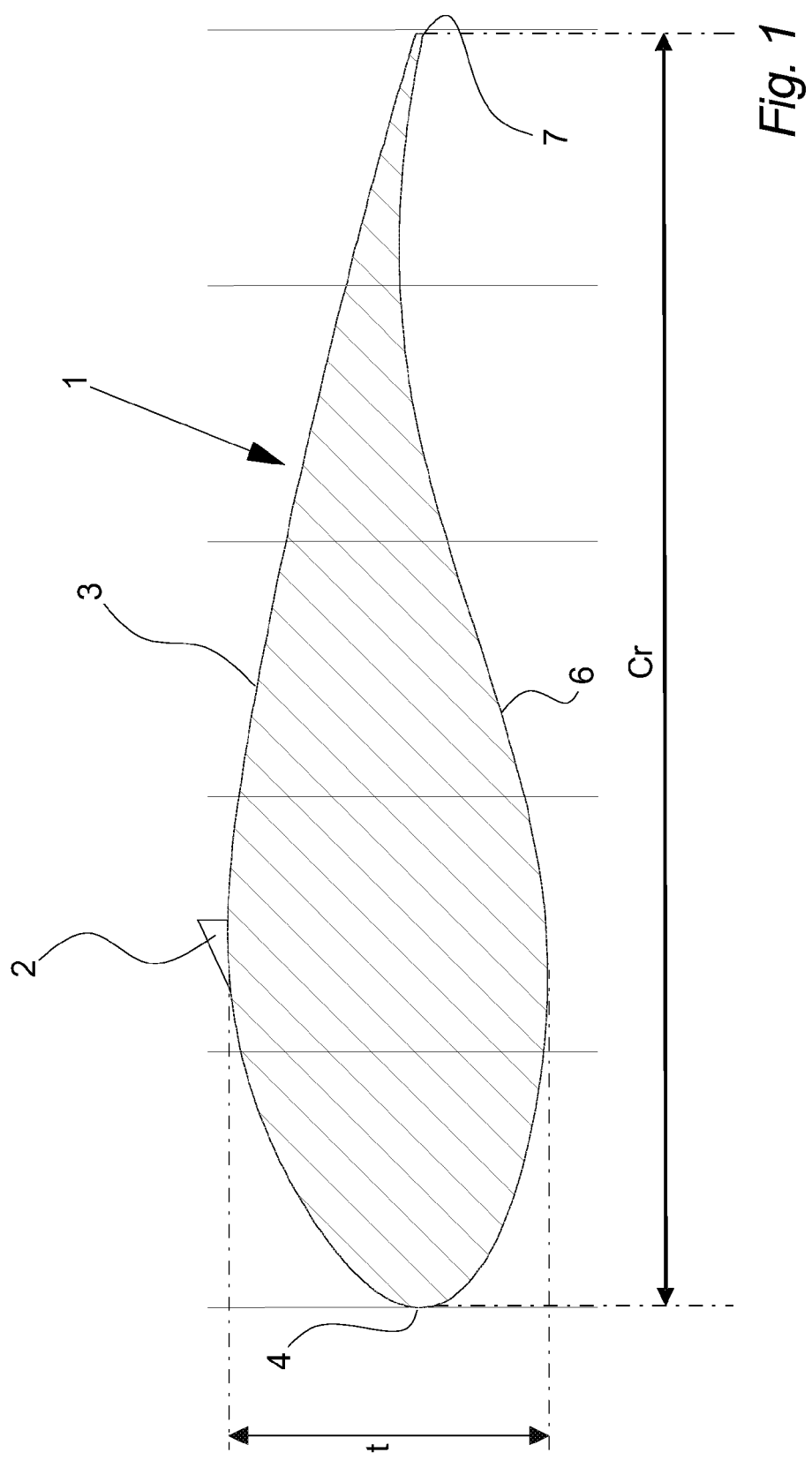
FIG. 1 is a cross-section of a blade with a vortex generator.

The principle of the preferred vortex generators is a delta shaped plate attached substantially orthogonal to the blade surface at the suction side (leeward side) of the wind turbine blade as shown in FIG. 1 depicting a cross-section of a blade 1 with a vortex generator 2 arranged on the suction side 3 of the blade 1 at a position of 30% of the chord length $c_r$ downstream of the leading edge 4 of the blade 1. The thickness t of the profile is also indicated. Other types of vortex generators than the ones discussed in this description may also be applied, please refer to the enclosed lists of references regarding vortex generators.

Figure 2:
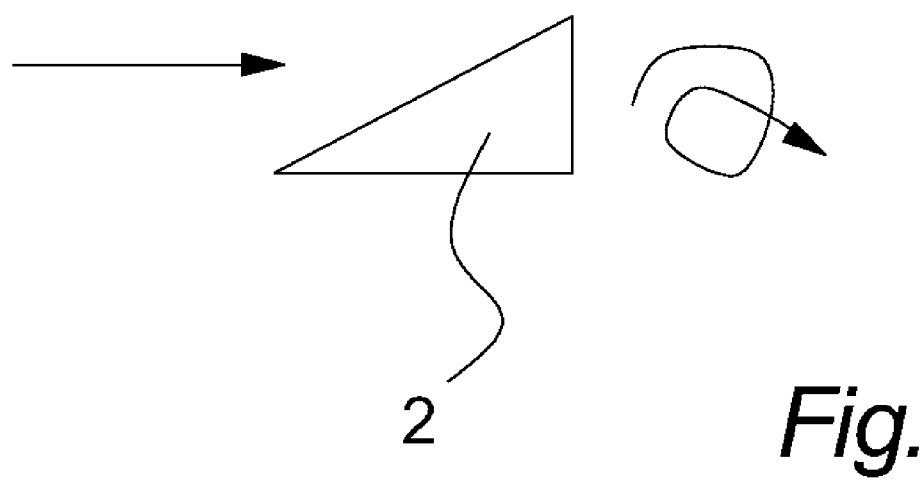
FIG. 2 shows a schematic vortex generator and the surrounding flow.

The vortex generators 2 induces vortices in the boundary layer substantially parallel to the direction of the flow over the blade and the vortices increases the kinetic energy of the airflow closest to the surface of the blade by transporting air of a higher velocity from the outer of the boundary layer down to the near surface region, thereby reinforcing the boundary layer and delay the separation of the boundary layer, i.e. the occurrence of stall to a much higher angle of attack. In FIG. 2, the principle is illustrated by a schematic vortex generator 2 with the incoming substantially laminar flow to the left of the vortex generator and the flow with vortices to the right after passing the vortex generator 2.

Figure 3:
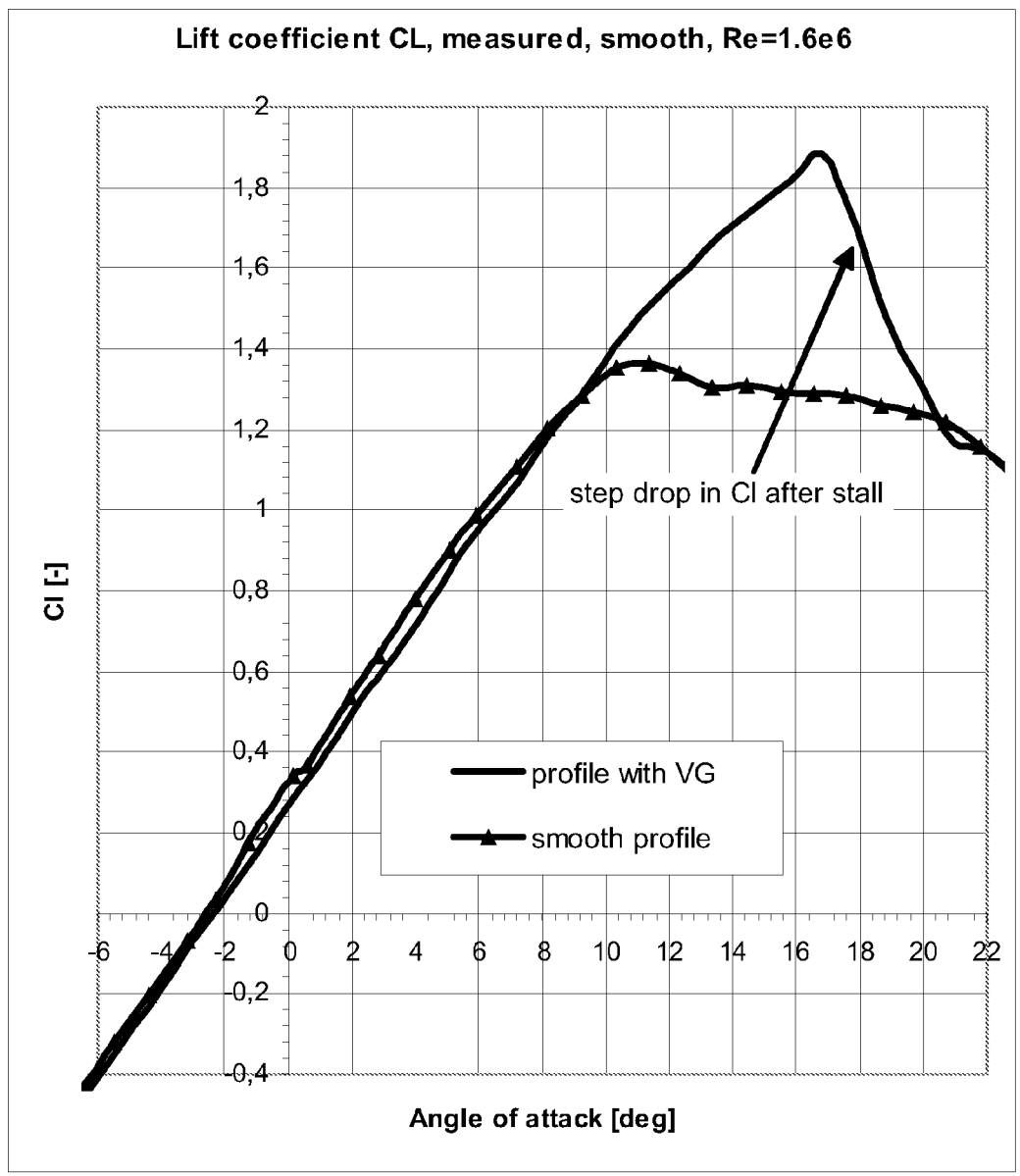
FIG. 3 shows the lift coefficient $C_L$ as a function of angle of attack (AoA) for an airfoil without vortex generator compared with an airfoil having a vortex generator.

The concept of using vortex generators to delay boundary layer separation has until now in the technical field of wind turbines mainly been applied to the inner part of blades for sole purpose of increasing the maximum lift coefficient. The reason for that is the penalty of using vortex generators is a large increase in drag during normal operation of the wind turbine and also induced noise from the vortex generators. Another drawback is that the lift tends to drop dramatically after the stall point is reached with huge variation in lift over a very small span in angle of attack, which leads to aerodynamic instability as illustrated in FIG. 3 showing the lift coefficient $C_L$ as a function of angle of attack (AoA) for an airfoil without vortex generator compared with an airfoil having a vortex generator (VG). Also, the drag coefficient $C_D$ as a function of angle of attack (AoA) for an airfoil without vortex generator compared with an airfoil having a vortex generator (VG) are shown in FIG. 4.

Figure 4:
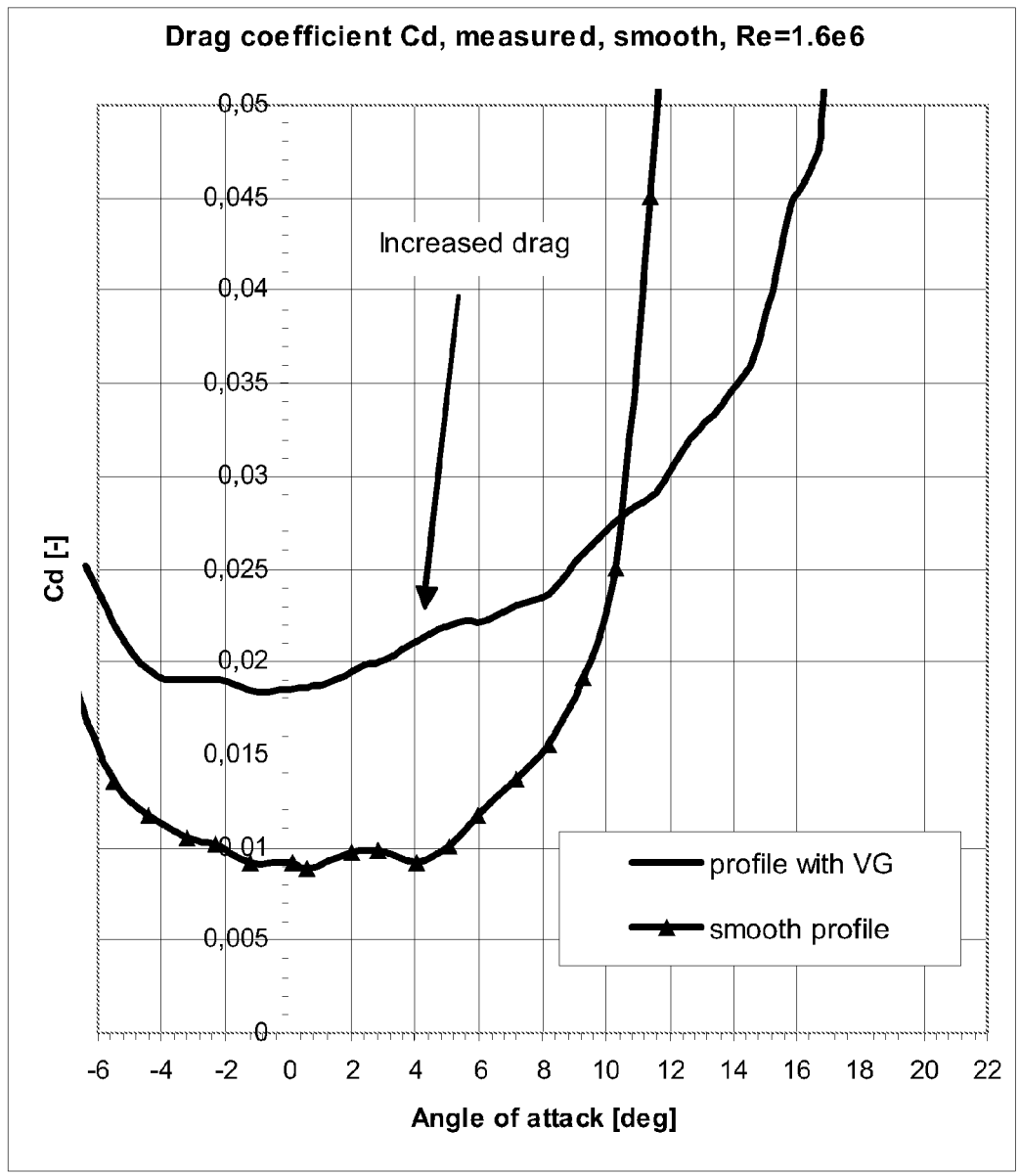
FIG. 4 shows the drag coefficient $C_D$ as a function of angle of attack (AoA) for the airfoil of FIG. 3 without vortex generator compared with an airfoil having a vortex generator.

It is important to note that a wind turbine blade having vortex generators and operated at a high angle of attack (AoA), e.g. of 14° and high lift coefficient $C_L$, the drag coefficient $C_D$ is much lower than compared to a blade without vortex generators as illustrated FIGS. 3 and 4. However, the wind turbine still operates more optimal at low AoA when running with optimal tip speed vs. wind speed ratio. Here, the largest value of the ratio $C_L/C_D$ which corresponds to the aerodynamic efficiency of the blade is found at low AoA of 4-7° and therefore the drag increase from the vortex generators should be as low as possible. It is only when the turbine is operated at high wind speed conditions where it is not able to run any faster due to generator limitations and noise restrictions that the effect of the vortex generators are exploited fully by increasing the AoA.

Figure 5:
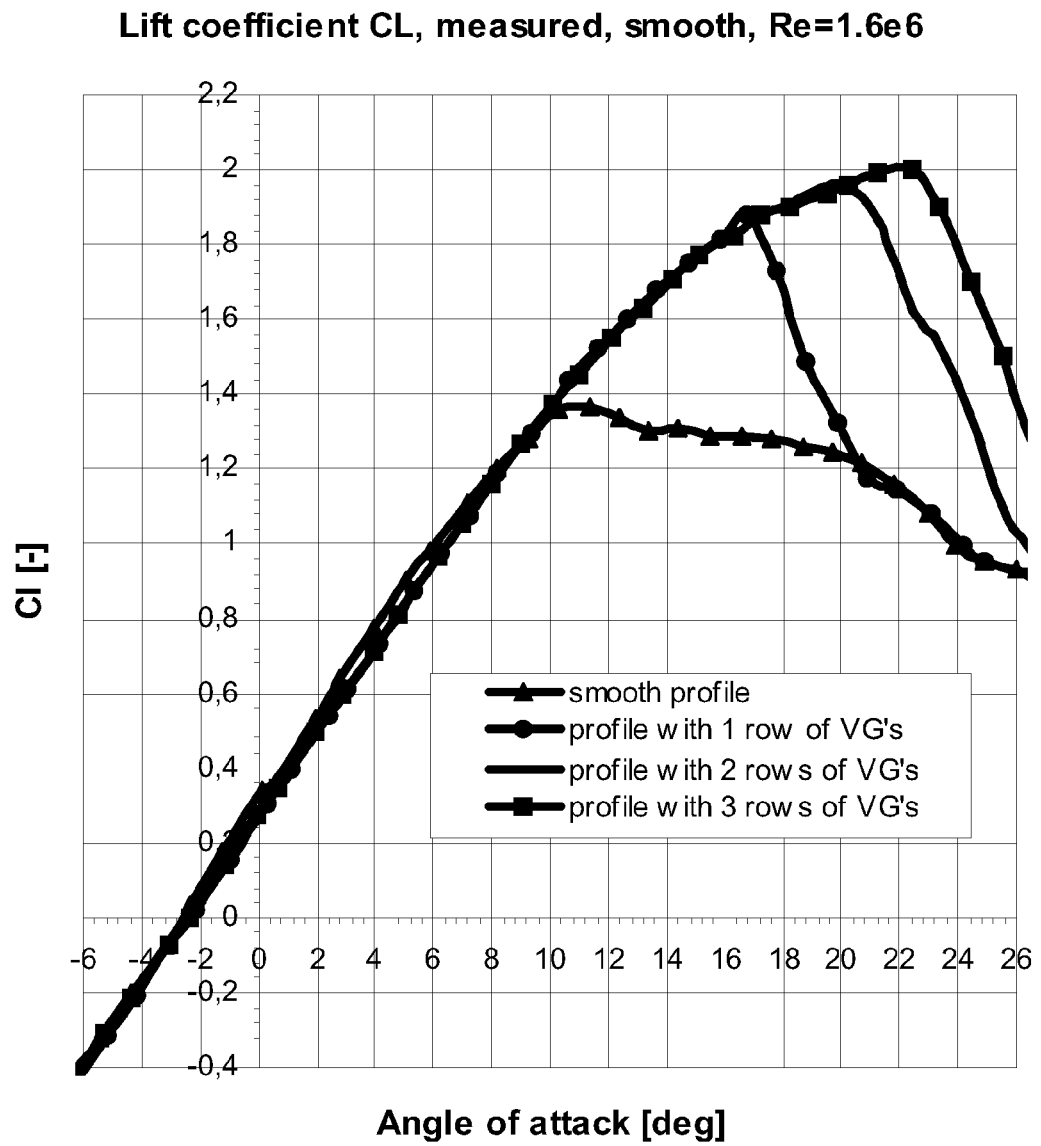
FIG. 5 shows the lift coefficient $C_L$ as a function of the angle of attack (AoA) for a wind turbine blade without vortex generators and with one, two and three rows of vortex generators.

Recent investigations by the inventor has show that by carefully designing the vortex generators by optimising the shape and size of the vortex generators and the span wise and chord wise position of the vortex generators on the wind turbine blade, the lift coefficient $C_L$ can be increased significantly without the drawbacks of a large increase in drag, self induced noise and very steep fall in lift after the stall point. A result of a simulation of the effect of vortex generators arranged in 1-3 rows is shown in FIG. 5 illustrating the lift coefficient $C_L$ as a function of the angle of attack AoA for a wind turbine blade without vortex generators and with one, two and three rows of vortex generators arranged at the optimal span wise positions on the blade of 20%, 50% and 70% distance of the chord length from the leading edge of the blade. The positive effect of the vortex generators increases with the number of the rows. For the calculations of the effect of only one row of vortex generators, large vortex generators of a height above 1% of the chord length has been applied.

Figure 6:
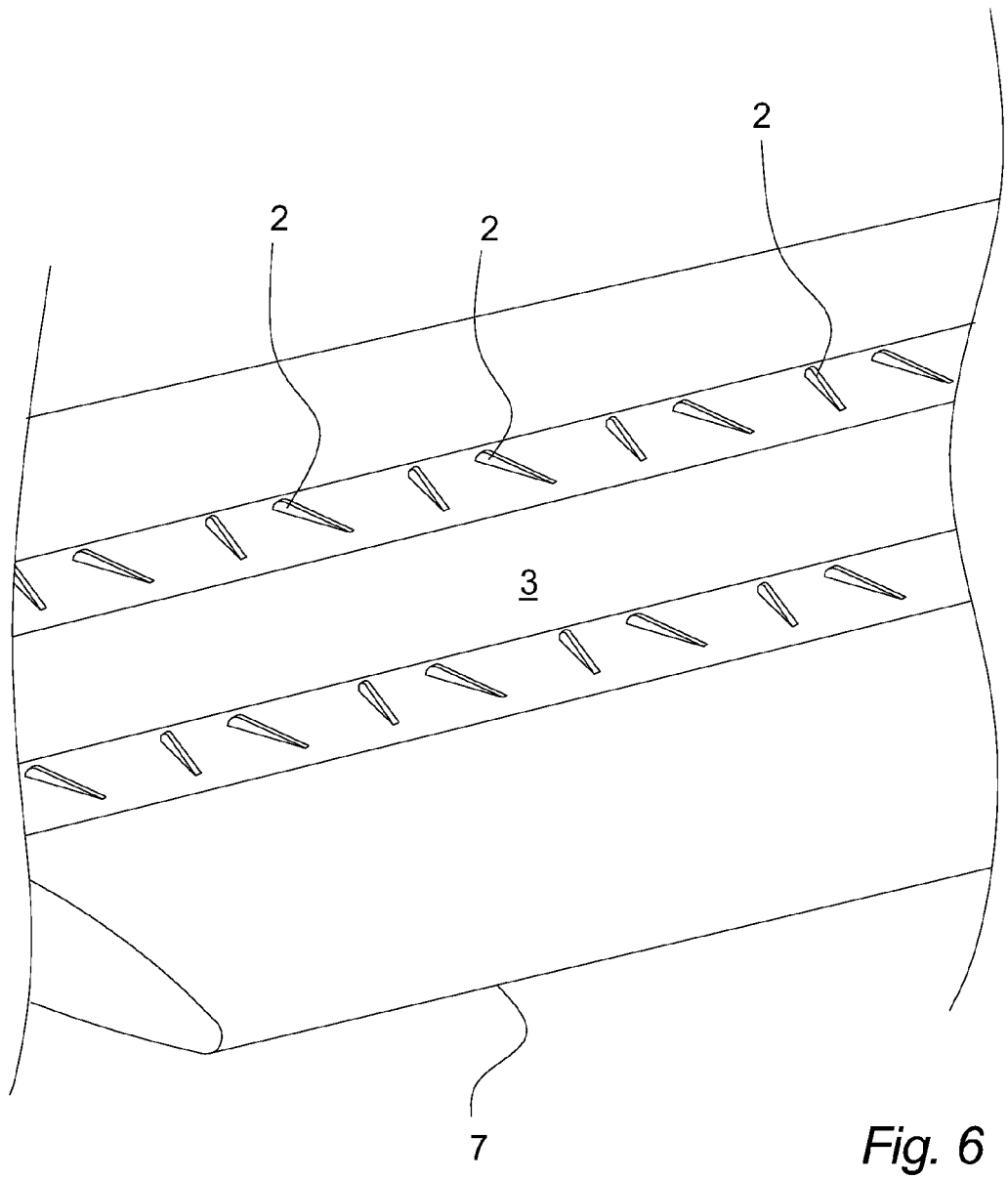
FIG. 6 is a perspective view of an ultra slender blade having two rows of micro vortex generators.
Figure 7:
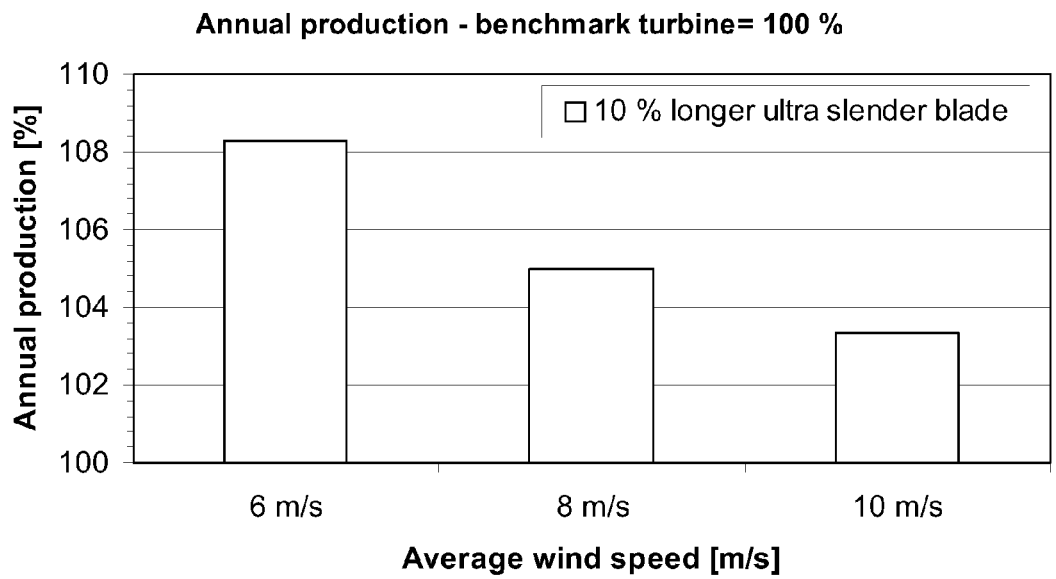
FIG. 7 shows a comparison of annual production of an original wind turbine having a three-bladed rotor compared with a rotor of a diameter enlarged by 5% and designed according to the invention.
Figure 8:
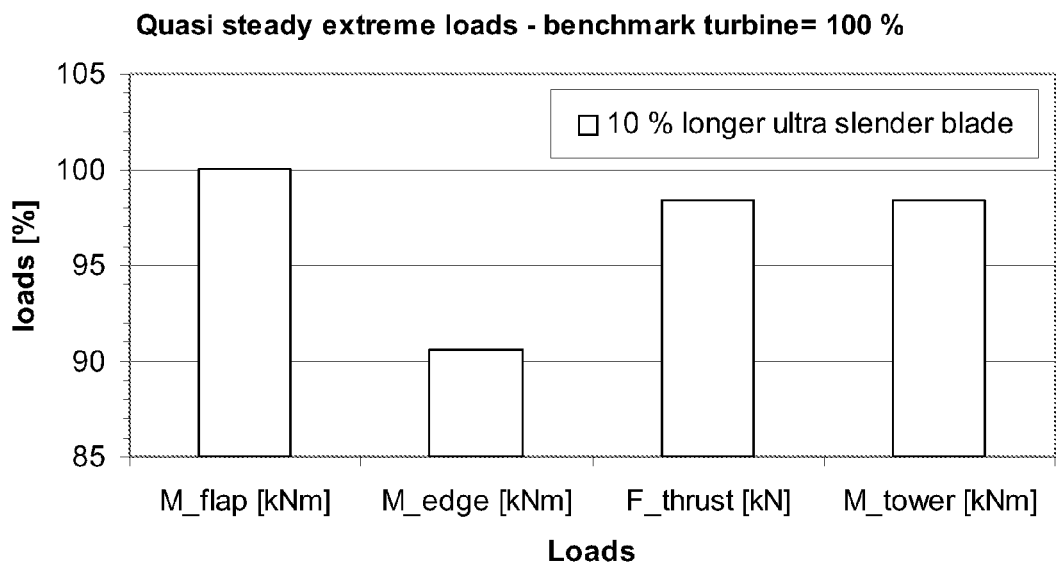
FIG. 8 shows a comparison of forces on a rotor of an original wind turbine having a three-bladed rotor compared with a rotor of a diameter enlarged by 5% and designed according to the invention.

Quasi steady calculation on an original wind turbine having a three-bladed rotor compared with a wind turbine having a rotor of a 5% increased diameter and ultra slender blades having ultra high lift coefficients with two rows of micro vortex generators as shown in perspective in FIG. 6 are illustrated in FIGS. 7 and 8 and demonstrates the highly positive effect of applying a rotor according to the present invention as defined in the appended claims. The enlarged rotor according to the present invention has up to 8% higher production and less loads for both flap wise and edge wise blade root moment as well as tower bottom moment.

Figure 9:
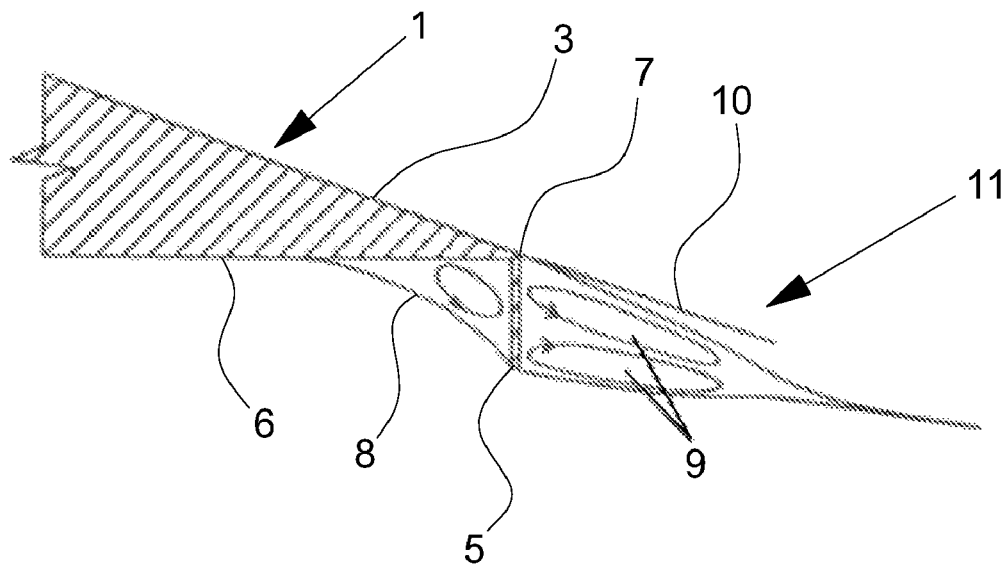
FIG. 9 is a cross-section of the trailing part of blade provided with a Gurney Flap.

The Gurney Flap is a triangle or plate mounted at the very trailing edge on the pressure side of the profile as shown in FIG. 9, illustrating a cross-section of the trailing part of a blade 1 having a Gurney Flap 5 in the shape of a plate extending downwards on the pressure side 6 of the blade 1 at the trailing edge 7 thereof substantially perpendicularly to the pressure side 6. An upstream separation bubble 8 is formed between the pressure side and the Gurney Flap 5, and a downstream separation bubble having two counter rotating vortices 9 is formed on the trailing side of the Gurney Flap 5. The downstream separation bubble has the effect that the suction side surface 3 is extended with a continuation 10 into the wake region 11 and the effect is to increase the local camber of the trailing edge.

Figure 10:
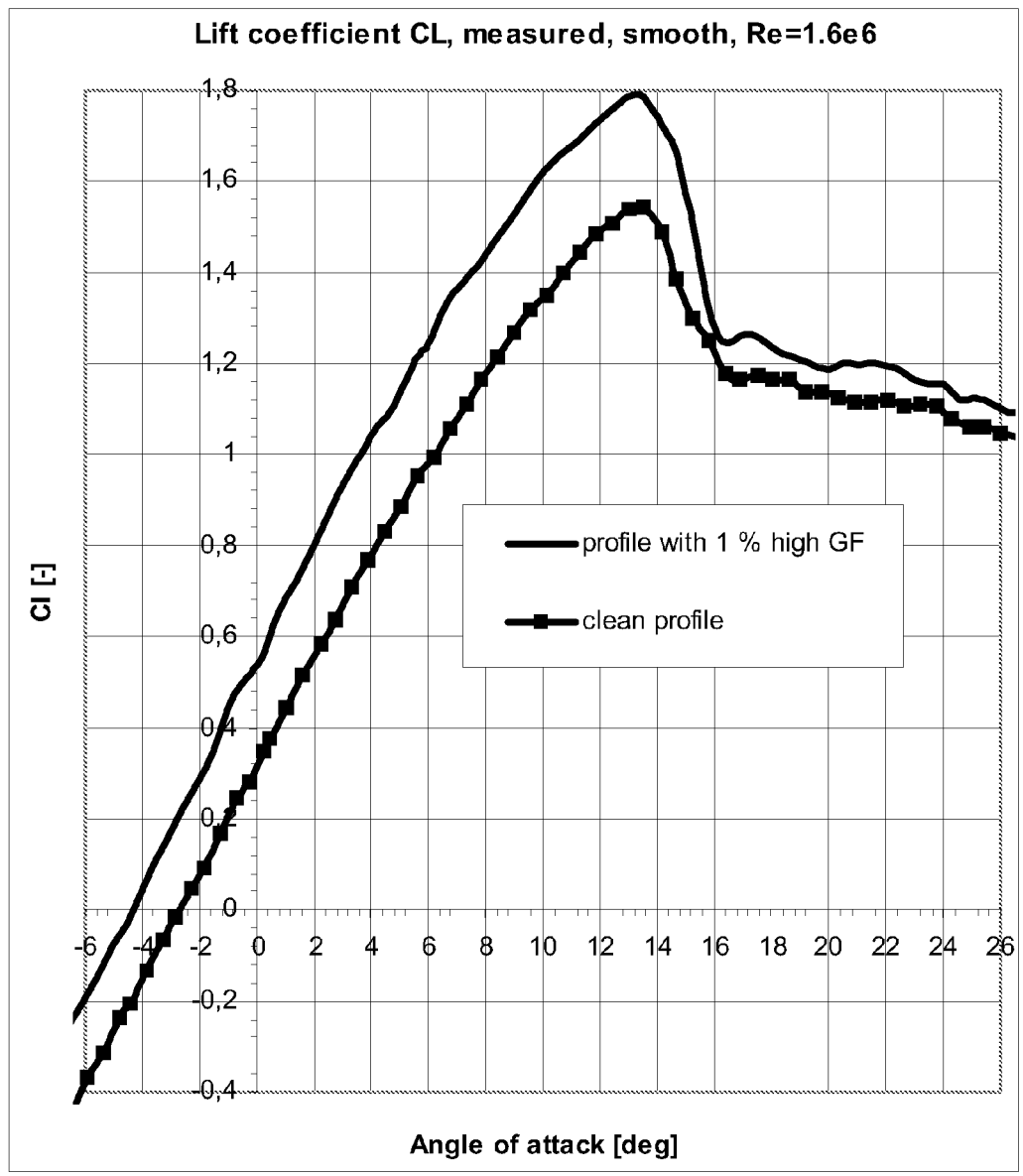
FIG. 10 shows the lift coefficient $C_L$ as a function of the angle of attack (AoA) for a wind turbine blade with and without a Gurney Flap.

The effect on the lift coefficient $C_L$ by adding a Gurney Flap of a height of 1% of the chord length is illustrated in FIG. 10.

The optimal height of the Gurney Flap 5 is crucial for efficient use on a wind turbine blade. Several investigation have shown that a Gurney flap with a height of 1% of the chord length increase the lift coefficient $C_L$ without any increase in the drag. A larger Gurney Flap means yield and increase of the drag and therefore are the benefits of the Gurney Flap diminished. A Gurney Flap smaller that 0.5% yield only a small increase in lift coefficient $C_L$.

Figure 11:
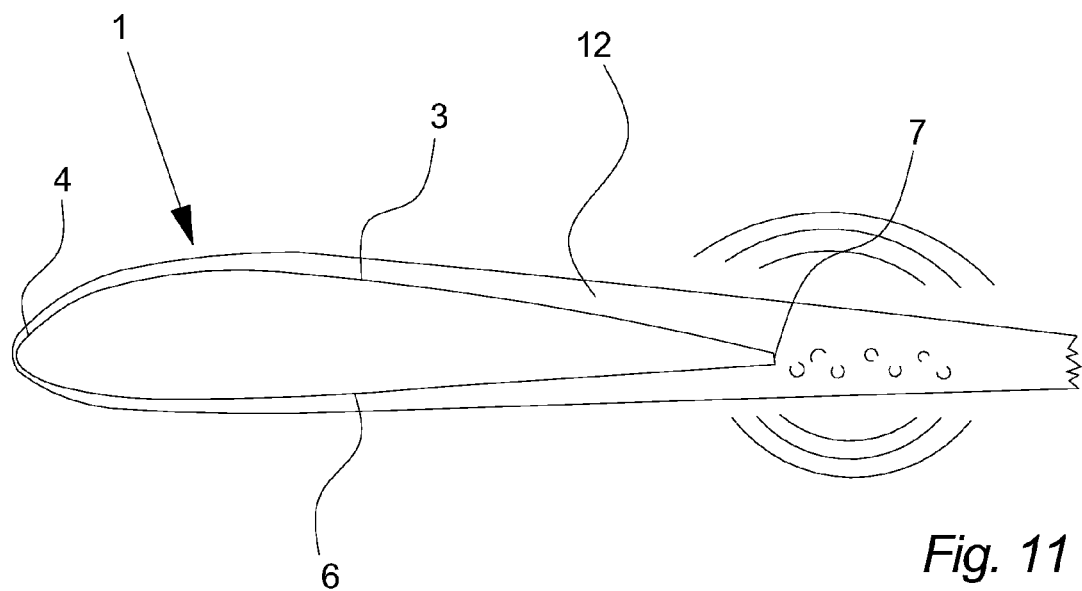
FIG. 11 illustrates the generation of noise from the trailing edge provided with a Gurney Flap The figures are provided for illustration purposes only and are not to be regarded as limiting for the scope of protection of the appended set of claims.

The radial position of the Gurney Flap along the longitudinal extend of the wind turbine blade is also important. The increase in trailing edge thickness by the Gurney Flap will introduce an increase noise level from the blunt trailing edge, as illustrated with FIG. 11 showing a cross-section of a wind turbine blade 1 with the boundary layer 12 indicated and vortex shedding from the trailing edge causing the generation of tonal noise being radiated from the trailing edge.

The strength of the noise level is proportional with the velocity of the blade at the local radial position to the power of 5 so doubling the speed means 32 times higher noise.

The Gurney Flap is therefore only useable at the inboard part of the blade were the local velocity is lower. The relevant radial span is from 0-50% of the total radius as measured form the hub centre of the rotor.

The Gurney Flap may be combined with or replaced by an adaptive trailing edge flap, such as the one disclosed e.g. in WO 2004/088130.

The blades may in a further preferred embodiment be equipped with a winglet as disclosed e.g. in WO 2004/061298 and EP 1 500 814.

What is claimed is:

1. A wind turbine blade comprising
   a first row of vortex generators arranged in a longitudinal direction of the blade on a suction side thereof, wherein a height of said vortex generators comprising the first row in a direction away from a surface of the blade is within the range of 0.1% to 0.65% of a chord length of the blade, and
   a second row of vortex generators arranged in the longitudinal direction of the blade on the suction side thereof, wherein a height of said vortex generators comprising the second row in a direction away from the surface of the blade is within the range of 0.1% to 1% of the chord length,
   wherein the first and second rows of vortex generators are provided along at least 10% of a longitudinal extent of the blade, and the second row of vortex generators extends at a chord wise distance from a leading edge in the range from 20% to 50% of the chord length further away from the leading edge than the first row of vortex generators.

2. The wind turbine blade according to claim 1, wherein the first and second rows of vortex generators are provided along an outer half part of the longitudinal extent of the blade.

3. The wind turbine blade according to claim 1, wherein the first row of vortex generators extends at a chord wise distance from the leading edge in the range from 10% to 40% of the chord length.

4. The wind turbine blade according to claim 1, wherein the second row of vortex generators extends at a chord wise distance from the leading edge in the range from 30% to 70% of the chord length.

5. The wind turbine blade according to claim 1, wherein the height of said vortex generators of the first row is within the range of 0.15% and 0.35% of the chord length.

6. The wind turbine blade according to claim 1, wherein the height of said vortex generators of the second row is within the range of 0.15% and 0.5% of the chord length.

7. A wind turbine rotor having at least two blades according to claim 1, wherein a combined radius specific solidity of the rotor is
   below a value of 0.022 at distance r from a hub being 50% of a rotor radius R,
   below a value of 0.015 at distance r from the hub being 70% of the rotor radius R, and
   below a value 0.009 at distance r from the hub being 90% of the rotor radius R.

8. The wind turbine rotor according claim 7, wherein the combined radius specific solidity of the rotor is
   below a value of 0.020 at distance r from the hub being 50% of the rotor radius R,
   below a value of 0.014 at distance r from the hub being 70% of the rotor radius R, and
   below a value 0.0085 at distance r from the hub being 90% of the rotor radius R.

9. The wind turbine rotor according claim 8, wherein the combined radius specific solidity of the rotor is
   below a value of 0.017 at distance r from the hub being 50% of the rotor radius R,
   below a value of 0.012 at distance r from the hub being 70% of the rotor radius R, and
   below a value 0.0075 at distance r from the hub being 90% of the rotor radius R.

10. The wind turbine rotor according to claim 7, wherein the vortex generators are provided in the form of a delta shaped protrusions which are slanted with respect to a transverse direction of the blades, so that they during operation of the rotor produce vortices with a centre line of vorticity extending substantially in the transverse direction of the blade.

11. The wind turbine rotor according to claim 10, wherein neighbouring vortex generators are slanted in opposing directions with respect to the transverse direction of the blade, so that the generated neighbouring vortices will obtain opposing directions of rotation.

12. The wind turbine rotor according to claim 7, wherein the combined radius specific solidity of the rotor is
    below a value of 0.043 at distance r from the hub being 20% of the rotor radius R, and
    below a value 0.036 at distance r from the hub being 30% of the rotor radius R.

13. The wind turbine rotor according to claim 12, wherein the combined radius specific solidity of the rotor is
    below a value of 0.038 at distance r from the hub being 20% of the rotor radius R, and
    below a value 0.031 at distance r from the hub being 30% of the rotor radius R.

14. The wind turbine rotor according to claim 13, wherein the combined radius specific solidity of the rotor is
    below a value of 0.033 at distance r from the hub being 20% of the rotor radius R, and
    below a value 0.025 at distance r from the hub being 30% of the rotor radius R.

15. The wind turbine rotor according to claim 7, wherein a ratio of a maximum thickness to the chord length of the blade profiles is
    within the range of 0.35 and 0.70 at distance r from the hub being 10% of the rotor radius R,
    within the range of 0.20 and 0.38 at distance r from the hub being 20% of the rotor radius R,
    within the range of 0.18 and 0.33 at distance r from the hub being 30% of the rotor radius R,
    within the range of 0.17 and 0.30 at distance r from the hub being 50% of the rotor radius R,
    within the range of 0.15 and 0.24 at distance r from the hub being 70% of the rotor radius R, and
    within the range of 0.15 and 0.18 at distance r from the hub being 90% of the rotor radius R.

* * * * *